(12) United States Patent
Tremblay et al.

(10) Patent No.: US 8,152,987 B2
(45) Date of Patent: Apr. 10, 2012

(54) METHOD FOR ENSURING AND MONITORING ELECTROLYZER SAFETY AND PERFORMANCES

(75) Inventors: Gilles Tremblay, Montreal (CA); Helmut Lademann, Hurth (DE); Georges Simard, Brossard (CA); Michel Veillette, St-Bruno (CA); Said Berriah, Laval (CA)

(73) Assignee: Recherche 2000 Inc., Montreal, Quebec (CA)

( * ) Notice: Subject to any disclaimer, the term of this patent is extended or adjusted under 35 U.S.C. 154(b) by 126 days.

(21) Appl. No.: 12/753,384

(22) Filed: Apr. 2, 2010

(65) Prior Publication Data

US 2011/0240483 A1 Oct. 6, 2011

(51) Int. Cl.
| | |
|---|---|
| C25B 15/02 | (2006.01) |
| C25B 15/06 | (2006.01) |
| G01R 19/145 | (2006.01) |
| G01R 19/15 | (2006.01) |
| G01R 19/155 | (2006.01) |
| G01R 19/165 | (2006.01) |
| G01R 19/30 | (2006.01) |
| G06F 9/44 | (2006.01) |
| G21C 17/00 | (2006.01) |

(52) U.S. Cl. ........ 205/337; 205/335; 204/401; 204/406; 204/228.1; 204/229.4; 204/230.2; 324/522; 702/33; 702/35; 702/58; 702/64; 702/182; 702/183; 702/185; 702/186

(58) Field of Classification Search .................. 205/335, 205/337; 204/401, 406, 228.1, 229.4, 230.2; 324/522; 702/33, 35, 58, 64, 182, 183, 185, 702/186
See application file for complete search history.

(56) References Cited

U.S. PATENT DOCUMENTS

| | | | |
|---|---|---|---|
| 6,432,569 B1 | 8/2002 | Zeilinger et al. | |
| 6,591,199 B2 * | 7/2003 | Tremblay et al. | 702/35 |
| 6,646,418 B1 | 11/2003 | Xie et al. | |
| 7,117,106 B2 * | 10/2006 | Rusta-Sallehy et al. | 702/63 |
| 7,616,006 B2 * | 11/2009 | Tremblay et al. | 324/522 |
| 7,797,137 B2 * | 9/2010 | Veillette et al. | 702/189 |
| 7,818,276 B2 * | 10/2010 | Veillette et al. | 706/47 |
| 2001/0039481 A1 * | 11/2001 | Tremblay et al. | 702/35 |
| 2005/0183948 A1 * | 8/2005 | Rusta-Sallehy et al. | 204/228.6 |
| 2005/0209800 A1 * | 9/2005 | Rusta-Sallehy et al. | 702/63 |
| 2006/0289312 A1 * | 12/2006 | Tremblay et al. | 205/335 |
| 2007/0208519 A1 * | 9/2007 | Veillette et al. | 702/35 |
| 2007/0259256 A1 * | 11/2007 | Le Canut et al. | 429/90 |
| 2007/0265713 A1 * | 11/2007 | Veillette et al. | 700/30 |
| 2009/0014326 A1 * | 1/2009 | Berriah et al. | 204/401 |

FOREIGN PATENT DOCUMENTS

| | | |
|---|---|---|
| CA | 2018639 | 12/1991 |
| GB | 1481371 | 7/1977 |

OTHER PUBLICATIONS

International Search Report for International Application No. PCT/CA2010/000635 mailed Jan. 13, 2011.
Xue et al., "Model-based condition monitoring of PEM fuel cell using Hotelling $T^2$ control limit", Journal of Power Sources, 162, (2006) pp. 388-399.

* cited by examiner

*Primary Examiner* — Bruce Bell
(74) *Attorney, Agent, or Firm* — Wolf, Greenfield & Sacks, P.C.

(57) ABSTRACT

There is described a method for ensuring and monitoring electrolyzer safety and performances in a manufacturing process which uses at least one electrolyzing cell containing at least one cathode and at least one anode separated by a membrane, comprising the step of: determining a safe single voltage operation range depending of the current and corresponding to the normally working electrolyzing cell; determining a reference voltage deviation depending on the time derivation of the current; measuring the voltage over time at the terminals of the electrolyzing cell; determining the measured voltage deviation by calculating the time derivative of the measured voltage; comparing the measured voltage to the safe single voltage operation range and the measured voltage deviation to the reference voltage deviation over time; stopping the manufacturing process when the measured voltage is outside the safe single voltage operation range or the difference between the measured voltage deviation and the reference voltage deviation is outside a predetermined range or a single voltage behavior is different than the average of a group of reference cells.

11 Claims, 4 Drawing Sheets

METHOD FOR ENSURING AND MONITORING ELECTROLYZER SAFETY AND PERFORMANCES

CROSS-REFERENCE TO RELATED APPLICATIONS

This is the first application filed for the present invention.

FIELD OF THE INVENTION

The present invention relates to a method for monitoring and ensuring electrolyzer safety and performances in a manufacturing process which uses at least one electrolyzing cell containing a cathode and an anode separated by a membrane.

The present invention also relates to a system for monitoring and ensuring electrolyzer safety and performances in a manufacturing process performed in a manufacturing unit which uses at least one electrolyzing cell capable of carrying out the method.

BACKGROUND

Electrolysis is used to produce higher value chemical in different areas of the chemical industry, such as for the production of sodium chlorate, caustic soda and chlorine. Usually, the electrolysis takes place in an electrolyzer comprising an anode wherein oxidation reaction takes place, a cathode wherein a reduction reaction takes place, these two electrodes being separated by a an ion exchange membrane.

Figure 1:
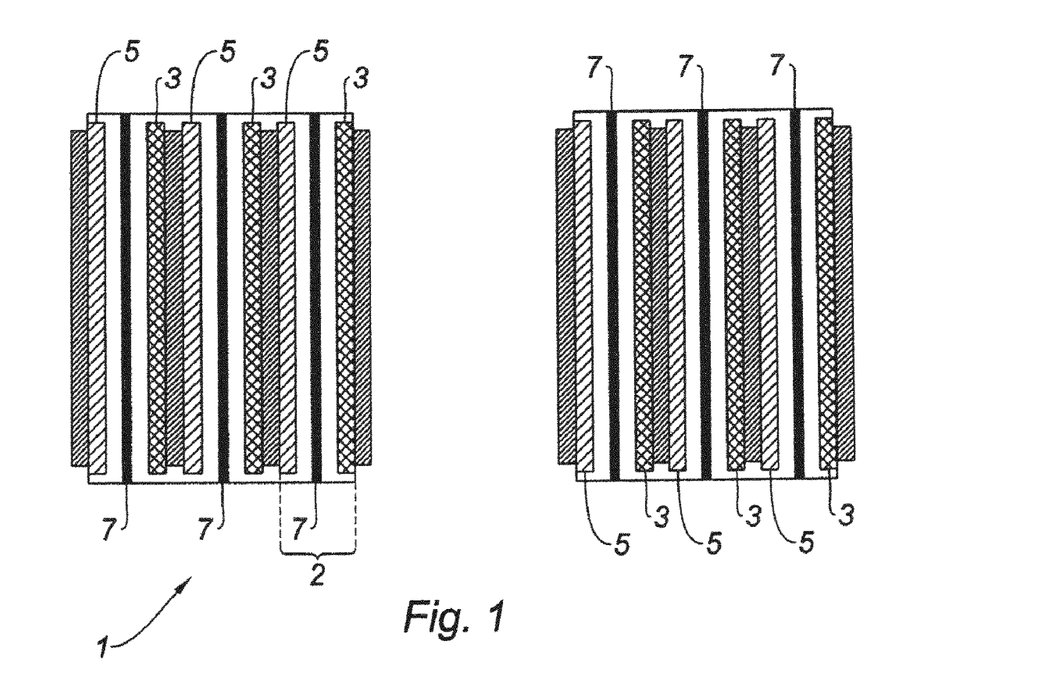
FIG. 1 is a schematic view of an electrolyzer.

An electrolyzer is usually composed of an electrolyzing cell 2 comprising an anode 3 and cathode 5 (see FIG. 1). It is at the anode 3 that the oxidation takes place and at the cathode 5 that the oxidant is electrochemical reduced. Electrons are generated at the anode 3 and flow through an external load to the cathode 5. Ions flow between the anode 3 and the cathode 5 in an electrolyte to complete the circuit. A thin proton exchange membrane 7 enables the passage of the ions from the anodic compartment to the cathodic compartment.

In case of production of chlorine, saturated brine (sodium chloride, NaCl) is provided at the anode side of the cell where chloride ions ($Cl^-$) are oxidized to chlorine ($Cl_2$). At the cathode side of the cell, water is reduced to hydrogen ($H_2$) and hydroxide ions ($OH^-$). The latter combine with the sodium ions ($Na^+$), migrating through the membrane from the anode side, to form caustic soda (NaOH).

The ways the anodes and cathodes are connected differ according to the technology. The electrodes can be connected in parallel, in series or in a combination thereof.

One of the problems associated with the monitoring of electrolyzing cells is the extremely hostile conditions in which they operate. This makes data acquisition difficult and unreliable. It is known, that the single cell voltage is without any delay responding to a malfunction of a cell. But the single cell voltage is also changing during normal operation, for example during a load change. Known single voltage monitoring systems are not precise and reliable enough to work as a safety system in a cell room and to cover the high risk class especially in case of cells, which are producing chlorine or/and hydrogen. Sometimes they are used to stop the process via the main process control system, if a certain high voltage level is reached. In practice the safety integrity level of these systems is not according to the risk level and the different kinds of malfunctions, which can be detected, is limited.

It is common, to install as a safety system a balance voltage monitoring system, which compares the average voltage of a group of cells with the average voltage of another group. This method is unreliable. During a short circuit for example one single voltage is reduced and the two single voltages of the neighbor cells are increased. Therefore the average voltage of the group is not changing.

It is also common to analyze the product quality to detect a malfunction of a cell. For example a defect membrane in case of the production of chlorine, caustic soda and hydrogen by the electrolysis of brine containing NaCl is resulting in an explosive mixture of hydrogen in chlorine. In most plants one analyzer is installed after the main chlorine cooler. Therefore in theory only an explosion outside the cell room can be avoided. But in practice also explosions in the chlorine treatment section happened, because of the response time of minutes of that analyzer, which is normally a gas chromatograph or a thermal conductivity detector.

SUMMARY

There is described herein a method and a system working together as a safety system according to SIL 2 of IEC 61511 to detect any malfunction of a cell and to shut down the cell before a risk occurs.

There is also described herein a method of monitoring an electrolysis and determining if individual cells are failing or badly performing.

To this end, one aspect is to provide a method for monitoring electrolyzer safety and performances in a manufacturing process which uses at least one electrolyzing cell containing at least one cathode and at least one anode separated by a membrane, comprising the step of: determining a safe single voltage operation range depending of the current and corresponding to the normally working electrolyzing cell; determining a reference voltage deviation depending on the time derivation of the current; measuring the single voltage over time at the terminals of the electrolyzing cell; determining the measured single voltage deviation by calculating the time derivative of the measured single voltage; comparing the measured single voltage of a cell with the safe single voltage operation range and the measured single voltage deviation of a cell with the reference voltage deviation and the measured single voltage deviation of a cell with the average voltage deviation of a group of reference cells over time; and stopping the manufacturing process when the measured single voltage is outside the safe single voltage operation range, or the difference between the measured single voltage deviation and the reference voltage deviation is outside a predetermined range, or a single voltage behavior is different than the average of a group of reference cells.

The method enables to compare the real voltage measured at the terminals of the electrolyzing cell as well as its voltage deviation and to compare these real data to the reference one wherein the electrolyzing cell works normally, that is to say that no event leading to the spoiling or the destruction of one electrolyzing cell may occur.

The normal functioning of the electrolyzing cell is determined by some conditions such as the age and/or the performance of this cell. It was surprisingly found that the majority of events responsible for spoiling and/or destroying an electrolyzing cell affects the voltage in each electrolyzing cell or involves great variation of this latter within a short time. Therefore, the user of the method is able to determine when the real data do not match with the normal data measured when the electrolyzing cell works normally. In this case, a step of stopping the manufacture process is performed in order to avoid any critical situation.

Causes of spoiling and/or destroying an electrolyzing cell may comprise: anode loss of coating, cathode loss of coating, cathode poisoning, electrode passivation, blockage in electrolyzing cell or liquor circuit, problem with the purification, insufficient brine feed, loss of feed caustic flow, membrane blistering, membrane fooling and membrane piercing.

Figure 4:
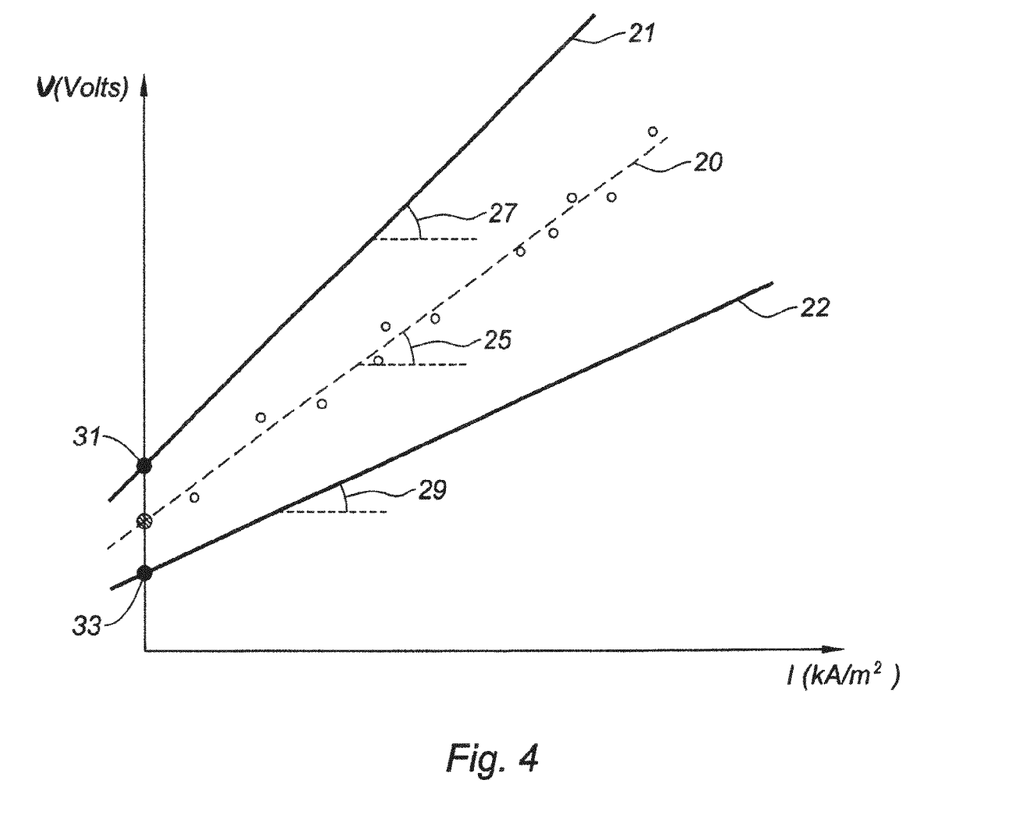
FIG. 4 is a polarization curve of one electrolyzing cell.

The present method is efficient for monitoring an electrolysis and for detecting any anomaly. Early detection of any anomaly without false alarms requires a cell specific operation range. Therefore a first step of the method is the analysis of the normal behavior with polarization curves. Based on the results the allowed operation range is defined (FIG. 4).

In one embodiment, the limits of safe single voltage operation range are the maximum voltage Umax(t) and the minimum voltage Umin(t) depending on the current I and the time t determined by respectively the following formulae:

$$U_{min}(t)=U_{0,min}+(k_{min}/A)\times I(t),$$

$$U_{max}(t)=U_{0,max}+(k_{max}/A)\times I(t),$$

wherein:

I(t) is the current passing through the cell;
$U_{0,min}$ and $U_{0,max}$ are comprised respectively between 2.20 V and 2.40 V and between 2.60 V and 2.80 V;
$k_{min}$ and $k_{max}$ are comprised respectively between 0.05 $V \cdot kA \cdot m^{-2}$ and 0.15 $V \cdot kA \cdot m^{-2}$ and between 0.15 $V \cdot kA \cdot m^{-2}$ and 0.25 $V \cdot kA \cdot m^{-2}$; and A is comprised between 1.5 $m^2$ and 5.4 $m^2$.

In one embodiment, the reference voltage deviation is equal to:

$$\frac{k \times \frac{dI}{dt}}{A}$$

wherein k is comprised between 0.10 $V \cdot kA \cdot m^{-2}$ and 0.20 $V \cdot kA \cdot m^{-2}$ and A is comprised between 1.5 $m^2$ and 5.4 $m^2$.

In one embodiment, the method is applied to a plurality of electrolyzing cells mounted in series.

In one embodiment, an aqueous solution comprising a salt of chloride is electrolyzed.

Another aspect described herein is a system for ensuring and monitoring electrolyzer safety and performances in a manufacturing process performed in a manufacturing unit which uses at least one electrolyzing cell capable of carrying out the method, the system comprising: a plurality of acquisition and transmission units, each of the acquisition and transmission units are configured to measure the single voltage at the terminals of each electrolyzing cell over time and to transmit the measured voltage; a treatment device for collecting the single measured voltage transmitted by each of the acquisition and transmission units, configured to determine a safe single voltage operation range depending on the current and corresponding to a normally working electrolyzing cell; determine a reference single voltage deviation depending on the time derivation of the current; determine the measured single voltage deviation by calculating the time derivative of the measured single voltage; compare the measured single voltage of a cell with the safe single voltage operation range and the measured single voltage deviation of a cell with the reference voltage deviation and the measured single voltage deviation of a cell with the average voltage deviation of a group of reference cells over time; and transmit the data to relay means; and a relay unit configured for implementing stopping the manufacturing process when the measured single voltage is outside the safe single voltage operation range or the difference between the measured single voltage deviation and the reference voltage deviation is outside a predetermined range or a single voltage behavior is different than the average of a group of reference cells, with the data issed from the treatment device and for transmitting an order for stopping the manufacturing process.

In one embodiment, the treatment device is connected to a server for receiving and analyzing the data issued from the treatment device.

In one embodiment, the treatment device is connected to intermediate device configured to relay and/or format the determined data to the server.

In one embodiment, the acquisition and transmission units are connected to the treatment device by at least one optical fiber.

There is also described a computer program product comprising one or more stored sequence of instruction that is accessible to a processor and which, when executed by the processor, causes the processor to carry out the steps of the method.

There is also described a computer readable medium carrying one or more sequences of instructions of the computer program product.

In one embodiment, the treatment device comprises means for implementing the computer readable medium.

BRIEF DESCRIPTION OF THE DRAWINGS

The invention will be better understood by the following description and is illustrated by the following figures.

Elements in the figures are illustrated for simplicity and clarity and have not necessarily been drawn to scale. For example, the dimensions of some of the elements in the figure may be exaggerated relative to other elements to help improve the understanding of the embodiments.

DETAILED DESCRIPTION

Figure 2:
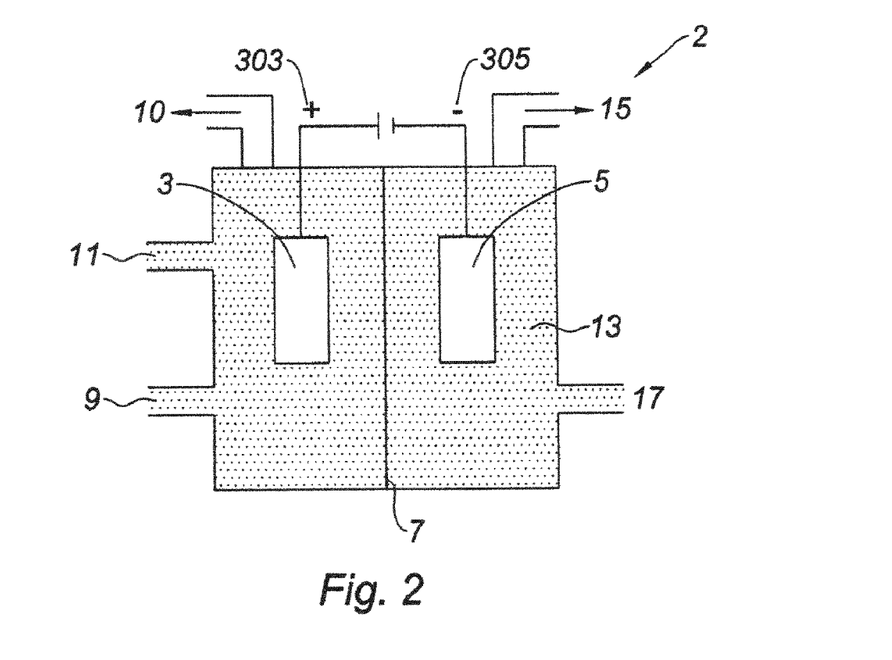
FIG. 2 is a schematic view of a cell for the electrolysis of sodium chloride.

As indicated in FIGS. 1 and 2, one cell 2 belonging to the electrolyzer 1 comprises an anode 3 and a cathode 5, with an ion exchange membrane 7 placed therebetween.

The anode 3 may be made of a titanium substrate with a noble metal based catalyst. The cathode 5 may be made of a nickel substrate with a noble metal based catalyst. The membrane 7 may be made of perfluorinated polymers with substituted carboxylic and sulphonic groups.

The cell 2 may be filled with an aqueous solution 9 of a saturated brine containing sodium chloride at the anode side 5 of the cell where chloride ions are oxidized to chlorine 10. At the cathode side 5 of the cell, water 13 forming the electrolyte is reduced to hydrogen 15 and hydroxide ions 17 which are exctracted from the cell 1. The latter combine with the sodium ions, migrating through the membrane 7 from the anode side 5, to form caustic soda.

In another embodiment, a solution of saturated potassium chloride is used, which results in the formation of caustic potash inside the cathode compartment 5.

According to an embodiment, hydrochloric acid is used, which results in the formation of water inside the cathode compartment 5.

According to another embodiment, the material of the cathode 5 may be adapted for consuming oxygen instead of producing hydrogen.

Surprisingly, it has been found that a cathode and membrane poisoning, an anode and cathode loss of coating and an electrode passivation start with a slow voltage increase, which evolves exponentially. If the electrolysis is not stopped, the electrolyte will boil and membranes or/and hoses will be destroyed. In the case of a membrane failure, the voltage will drop from abnormal high to abnormal low because of internal or external short circuits, or the production of oxygen instead of chlorine as a consequence of mixed electrolytes, brine and caustic soda.

Furthermore, in case of insufficient electrolyte feed, temperature and concentration control failing the voltage will rise fast and the electrolyte may boil. In case of differential pressure out of range, a reverse differential pressure tends to lead to a voltage increase as soon as the membrane starts failing, the voltage is decreasing. Membrane pinholes, tears and blisters, result in an abnormally low voltage. Leaking cells present an abnormal low voltage. if the electrolytes are mixed or abnormally high voltages if a compartment runs dry.

A short circuit normally affects the cell voltage of three cells. It has been found that the cell voltage of the cell in the middle is abnormally low and the cell voltages of the neighbors are abnormally high.

In summary, the voltage of the affected cell increases or/and decreases significantly within a short time and leaves the allowed operating band, which is a function of the actual current.

Figure 3:
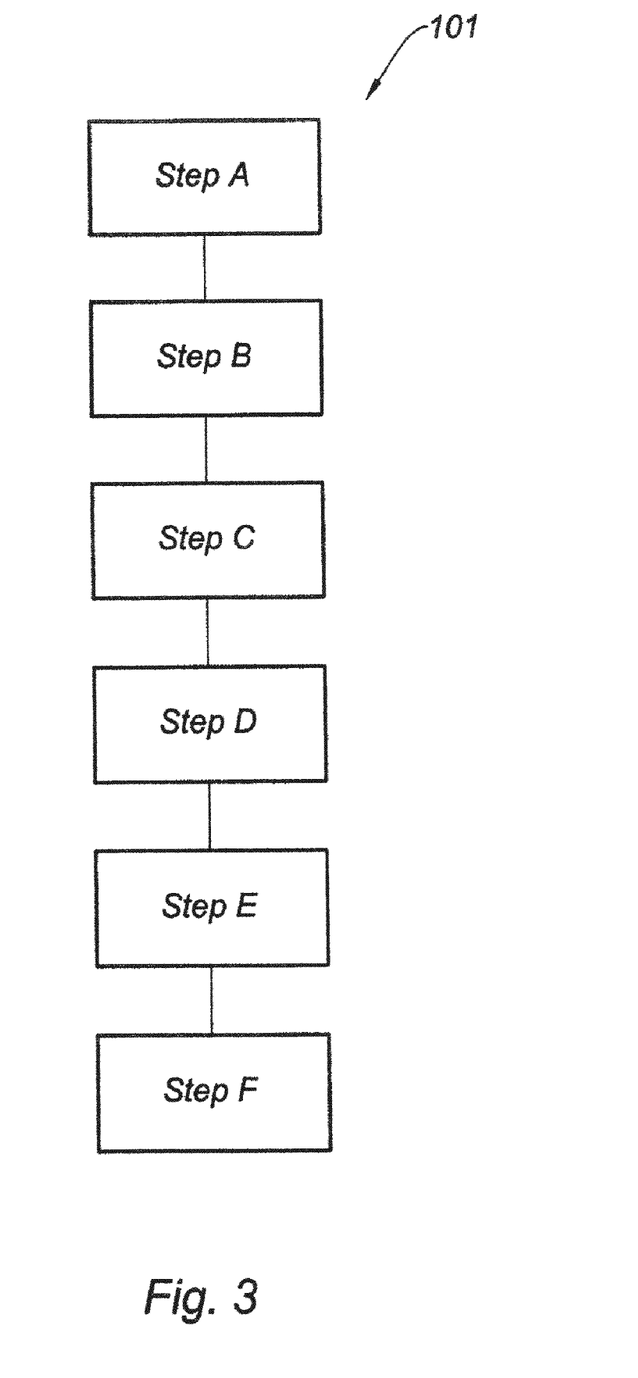
FIG. 3 is a schematic diagram of a method in accordance with one embodiment.

As illustrated in FIGS. 2 and 3, the method 101 comprises the step of: (A) determining a safe single voltage operation range corresponding to the normally working electrolyzing cell 2; (B) determining a reference voltage deviation determined by the time derivative of the current passing through the cell; (C) measuring the single voltage over time at the terminals 303 and 305 of the electrolyzing cell 2; (D) determining the measured single voltage deviation by calculating the time derivative of the measured single voltage; (E) comparing the measured single voltage of a cell with the safe single voltage operation range and the measured single voltage deviation of a cell with the reference voltage deviation and the measured single voltage deviation of a cell with the average voltage deviation of a group of reference cells over time; and (F) stopping the manufacturing process when the measured single voltage is outside de safe single voltage operation range or the difference between the measured single voltage deviation and the reference voltage deviation is outside a predetermined range or a single voltage behavior is different than the average of a group of reference cells.

The method 101 enables a detection of an abnormal value of the voltage at the terminal 3 and 5 of at least one of the electrolyzing cell 2 as well as an abnormal variation of the latter. Therefore, the method implies monitoring the cell voltage and current and stopping the manufacturing process if the cell voltage is outside of the allowed range, before a chlorine 10 and/or hydrogen 15 release or an explosive mixture of chlorine and hydrogen occurs.

According to embodiment, the method may be applied to a plurality of electrolyzing cells, such as two, ten or a hundred. More precisely, step A of the method implies the determination of a safe single voltage operation range in which the electrolyzing cell works normally. The wording "works normally" correspond to a running of the electrolysis in the electrolyzing cell 2 in which there is no risk of explosion or spoiling the electrolyzing cell 2.

In case of a plurality of electrolyzing cells 2 monitored by a method 101, the electrolyzing cells 2 may be identical or different. The normal operating range depends on the performance of the installed membrane, the electrode gap, the type of catalyst on the anodes and cathodes etc. The definition of the allowed safe single voltage operation range depends also on the process and the electrolyzing cell 2 technology supplier.

The limits of the safe single voltage operation range of step A of the method may be determined by experiments or, in one embodiment, by calculating the value of the maximum voltage and the minimum voltage of the electrolyzing cell 2 for each time.

The calculation may be executed by these formulae:

$$U_{min}(t) = U_{0,min} + (k_{min}/A) \times I(t),$$

$$U_{max}(t) = U_{0,max} + (k_{max}/A) \times I(t),$$

wherein $U_{0,min}$, $U_{0,max}$, $k_{min}$ and $k_{max}$ are determined by the polarization curve of the cell (see FIG. 4).

In FIG. 4 is represented a real polarization curve 20 which is bounded by two polarization curves 21 and 22. The polarization curve 20 is obtained by reporting the real voltage (U) at the terminals 303 and 305 of the cell 2 measured at different current levels (I) (see FIG. 2). The two curves 21 and 22 delimit the normally working of the electrolyzing cell 2. They are calculated during step A of the method. The resulting allowed operating range is covering the normal fluctuations of the parameters $U_0$ and k. The method includes a software module to determine the curves 21 and 22 from historical data. However, they can be generated also with parameters given by the cell or cell component suppliers.

The real polarization curve 20 presents a real slope 25 representing the resistive effect of the cell 2. This real slope 25 is surrounded by the minimal 27 and the maximal 29 slopes $k_{min}$ and $k_{max}$ of the two theoretical polarization curves 21 and 22.

$k_{min}$ may be included between 0.05 $V \cdot kA \cdot m^2$ and 0.15 $V \cdot kA \cdot m^{-2}$, around 0.10 $V \cdot kA \cdot m^{-2}$. $k_{max}$ may be included between 0.15 $V \cdot kA \cdot m^2$ and 0.25 $V \cdot kA \cdot m^2$, i.e. around 0.20 $V \cdot kA \cdot m^{-2}$. $U0_{min}$ and $U0_{max}$ of the formula correspond to the intercept with the voltage axis of the polarization curve 31 and 33. $U0_{min}$ may be comprised between 2.20 V and 2.40 V, i.e. around 2.30 V. $U0_{max}$ may be comprised between 2.60 V and 2.80 V, i.e. around 2.70 V.

A is the total surface of the cell and is typically included between 1.5 $m^2$ and 5.4 $m^2$, i.e. around 3.0 $m^2$. Consequently, the high precision (+/−1.5 mV) of the inventive system enables the earliest possible detection of abnormal behaviors by monitoring the voltage deviation over time (step E of the method).

Step B is performed by determining the reference voltage deviation determined by the time derivation of the current passing through the cell. According to one embodiment, the reference voltage deviation is obtained by the formula:

$$\frac{k \times \frac{dI}{dt}}{A}$$

wherein k is the slope 25 of the real polarization curve 20 and comprised between 0.10 $V \cdot kA \cdot m^{-2}$ and 0.20 $V \cdot kA \cdot m^{-2}$, around 0.15 $V \cdot kA \cdot m^{-2}$; and A is the total surface of the cell 2 and typically inlcuded between 1.5 $m^2$ and 5.4 $m^2$, around 3.0 $m^2$.

Step C is performed by measuring the voltage over time at the terminals 303 and 305 of one electrolyzing cell or of each of the plurality cells (see FIG. 2). According to a variant, the voltage may be measured at regular time range, such as 1 second or/and 1 minute.

Step D is performed by determining the measured voltage deviation by calculating the time derivative of the measured voltage.

Step E is performed by comparing the measured voltage to the safe single voltage operation range and the measured voltage deviation to the reference voltage deviation over time.

Step F is performed by stopping the manufacturing process when the measured voltage is outside the safe single voltage operation range or the difference between the measured voltage deviation and the reference voltage deviation is outside a predetermined range.

According to one embodiment, the predetermined range is between ±50 mV and ±500 mV.

The steps D, E and F may be carried out by an appropriate computer program executed by a computer.

The method 101 presents the feature of being able to detect any problem occurring during the working of one or a plurality of electrolyzing cells 2 in a few steps. As indicated above, in case of a plurality of electrolyzing cells 2, these latter are mounted in series. The measure voltage is thus the voltage measured at the terminals 303 and 305 of each electrolyzing cell 2 (see FIG. 2). The amount of electrolyzing cells 2 mounted in series may lie typically between 1 and 200 electrolyzing cells 2 per electrolyzer 1.

The chemical potential required for the reaction to take place may lie between 2 VDC and 4 VDC. In case, 200 electrolyzing cells 2 are mounted in serie, the total potential of the electrolyzer 1 from end to end may reach about 800 VDC. The current required for the electrolysis depends on the surface of the electrodes 3 and 5 and the desired production rate. For example, the electrolyzing cell 2 may operate between $2 \text{ kA} \cdot \text{m}^{-2}$ and $7 \text{ kA} \cdot \text{m}^{-2}$.

Figure 5:
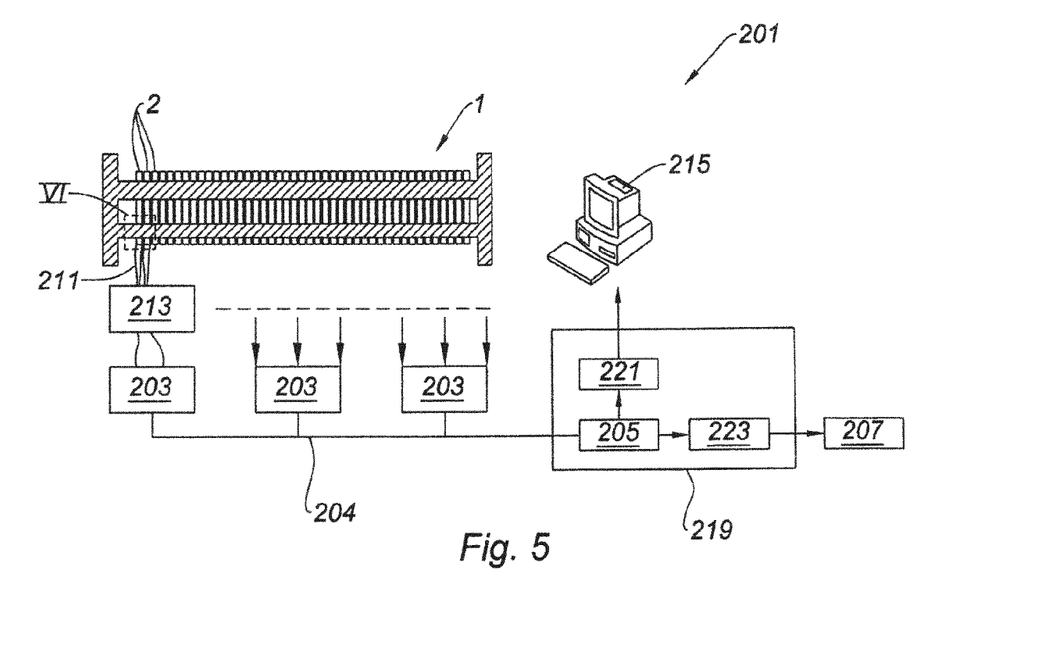
FIG. 5 is a schematic view of a system according to an embodiment.

As illustrated in FIG. 5, the method 101 may be implemented by a system 201 for monitoring an electrolyzer 1 performance in a manufacturing process which uses at least one electrolyzing cell 2 as described above, the system 201 comprising: a plurality of acquisition and transmission units 203, each of the acquisition and transmission units 203 intended to measure the single voltage at the terminals 303 and 305 of each electrolyzing cell 2 over time according to step C and to transmit the measured voltage; a treatment device 205 for collecting the single measured voltage transmitted by each of the acquisition and transmission units 203, intended to implement steps A, B, D and E and to transmit a shutdown order to a shutdown system 207; and a shutdown system 207 connected to the manufacturing unit comprising the electrolyzer 1, wherein the manufacturing process takes place, intended to stop the manufacturing process according to an shutdown order sent by the treatment device 205.

Figure 6:
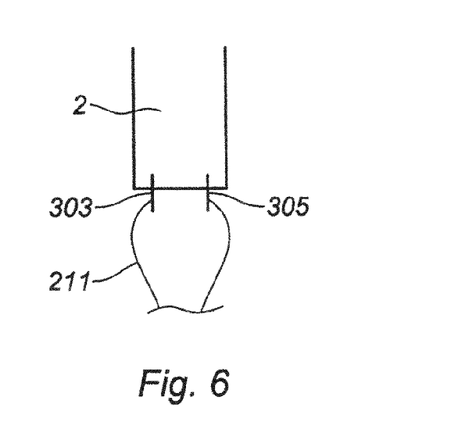
FIG. 6 is a view of the section VI of FIG. 5.

The data acquisition and transmission unit 203 is intended to measure the voltage at the terminal 303 and 305 of each electrolyzing cell 2 over time according to step C and to transmit the measured voltage. The measurement of the voltage may be performed by using metal wires 211 connected to the inputs of the said acquisition unit 203. To increase the accuracy of the measuring values and the minimization of noise, the wires 211 may be concentrated in a multicable protected cable. As illustrated by FIG. 6, the wires 211 may be bound to the terminals 303 and 305 of an electrolyzing cell 2 by any means known by the skilled person, such as bolts.

A TFP (Terminal Fuse Protection) device 213 may be disposed between the electrolyzing cell(s) 2 and the acquisition and transmission unit 203. The acquisition and transmission unit 203 may specifiquely contain a hardware devices capable of acquiring data from one or a plurality of electrolyzing cells 2, and transmit them to the other units. It may include electronic boards called MODA (Module Acquisition) that measure at least one of the voltage at the terminals 303 and 305 of the electrolyzing cell 2 and may further be adapted to measure other variables such as temperatures and gas concentrations measured by adequate sensors. The MODA contains A/D converters that convert the analogic signals into digital signals with a defined sampling rate, memory buffers, digital filters that eliminate the undesired noise and, in the core, a microcontroller used to run the acquisition and transmission procedures. The components of the acquisition units 203 may be contained in a hermetic box that protects them from the surrounding hostile environment.

All the data issued from the acquisition and transmission unit 203 are sent to the treatment device 205, called the SFOCOM (SIL Fiber Optic Communication Module).

According to one embodiment, the data is sent via optical fibers 204. The SFOCOM 205 is a board plugged in a personal computer or terminal. It is capable of receiving, concentrating and formating the data streams into data rows to make them recordable by the database and data management unit 215. The SFOCOM 205 may be located in a hermetic enclosure 219, called ECAM enabling the supply of the power of the treatment device 205. The treatment device 205 may comprise means for implementing a product of computer program capable of carried out the method. The SFOCOM 205 is also connected to a database and data management unit 215, such as a server, for receiving the data issued from the SFOCOM 205. The server 215 is equipped with a database to store all the sampled data and events for further investigation if any abnormal situation will occur.

An intermediate device 221, called EFOCOM (Ethernet Fiber Optic Communication Module), may be used for connecting the SFOCOM 205 with the server 215. The intermediate device 221 is able to relay the data collected by the SFOCOM 205 to the server 215. The intermediate device 221 is mainly used for data transmission purpose and the execution of additional advanced supervision algorithms if needed. The relay unit 223 is connected to the treatment device 205. The relay unit 223 is configured for implementing step F with the data issued from the treatment device and for transmitting an order for stopping the manufacturing process. The order delivered by the relay unit 223 is sent to a shutdown unit 207 is capable of stopping the electrolysis by sending an order sent by the SFOCOM 205. The shutdown unit 207 may be for example the central Digital Control System of the plant (DCS) or/and the control system of the transformer rectifier.

The connection between the SFOCOM 205, the server 215, the relay unit 223 and, if necessary, the EFOCOM 221, may be made by using optical fibers.

The method and system described apply to an electrolysis carried out in any electrolyzer. In particular, it may be also used in a fuel cell.

A fuel cell is a special type of electrolyzer that is used as a generator. It converts the chemical energy of a fuel into electrical energy. A fuel cell is usually composed of a number of electrolyzing cells 2 each comprising an anode 3 and cathode 5. It is at the anode 3 that the fuel is electrochemically oxidized and at the cathode 5 that the oxidant is electrochemically reduced. Electrons are generated at the anode 3 and flow through an external load to the cathode 5. Ions flow between the anode 3 and the cathode 5 in an electrolyte to complete the circuit. A thin proton exchange membrane 7 enables the passage of the ions from the anodic compartment to the cathodic compartment.

There are different fuel cell technologies. The proton exchange membrane fuel cell (PEMFC) is one of them. The PEMFC is also known as a solid polymer electrolyte (SPE) fuel cell.

The embodiments described above are intended to be exemplary only. In particular, any of the features illustrated in the attached drawings and described above may be used in various combinations thereof. The scope of the invention is therefore intended to be limited solely by the scope of the appended claims.

The invention claimed is:

1. A method for ensuring and monitoring electrolyzer safety and performances in a manufacturing process which uses at least one electrolyzing cell containing at least one cathode and at least one anode, comprising the step of:
   determining a safe single voltage operation range depending on the current and corresponding to a normally working electrolyzing cell;
   determining a reference single voltage deviation depending on the time derivation of the current;
   measuring the single voltage over time at the terminals of the electrolyzing cell;
   determining the measured single voltage deviation by calculating the time derivative of the measured single voltage;
   comparing the measured single voltage of a cell with the safe single voltage operation range and the measured single voltage deviation of a cell with the reference voltage deviation and the measured single voltage deviation of a cell with the average voltage deviation of a group of reference cells over time; and
   stopping the manufacturing process when the measured single voltage is outside the safe single voltage operation range or the difference between the measured single voltage deviation and the reference voltage deviation is outside a predetermined range or a single voltage behavior is different than the average of a group of reference cells.

2. The method according to claim 1, wherein the predetermined range is based on learning, also assisted by artificial neural networks or solver engines, the historical relationship between single voltage, current and other operating parameters.

3. The method according to claim 1, wherein the limits of safe single voltage operation range are the maximum voltage $U_{max}(t)$ and the minimum voltage $U_{min}(t)$ depending on the current I and the time t determined respectively by the following formulae:

$$U_{min}(t)=U_{0,min}+k_{min}/A\times I(t)$$

$$U_{max}(t)=U_{0,max}+k_{max}/A\times I(t),$$

wherein:
   I(t) is the current passing through the cell;
   $U_{0,min}$ and $U_{0,max}$ are comprised respectively between 2.20 V and 2.40 V and between 2.60 V and 2.80 V;
   $k_{min}$ and $k_{max}$ are comprised respectively between 0.05 V·kA·m$^{-2}$ and 0.15 V·kA·m$^{-2}$ and between 0.15 V·kA·m$^{-2}$ and 0.25 V·kA·m$^{-2}$; and
   A is comprised between 1.5 m$^2$ and 5.4 m$^2$.

4. The method according to claim 1, wherein the reference voltage deviation is equal to $$\frac{k\times\frac{dI}{dt}}{A}$$

wherein k is comprised between 0.1 V·kA·m$^{-2}$ and 0.2 V·kA·m$^{-2}$ and A is comprised between 1.5 m$^2$ and 5.4 m$^2$.

5. The method according to claim 1, further comprising applying to a plurality of electrolyzing cells mounted in series.

6. The method according to claim 1, wherein an aqueous solution comprising a salt of chloride is electrolyzed.

7. A system for ensuring and monitoring electrolyzer safety and performances in a manufacturing process performed in a manufacturing unit which uses at least one electrolyzing cell, the system comprising:
   a plurality of acquisition and transmission units, each of the acquisition and transmission units are configured to measure the single voltage at the terminals of each electrolyzing cell over time and to transmit the measured voltage;
   a treatment device for collecting the single measured voltage transmitted by each of the acquisition and transmission units, configured to
      determine a safe single voltage operation range depending on the current and corresponding to a normally working electrolyzing cell;
      determine a reference single voltage deviation depending on the time derivation of the current;
      determine the measured single voltage deviation by calculating the time derivative of the measured single voltage;
      compare the measured single voltage of a cell with the safe single voltage operation range and the measured single voltage deviation of a cell with the reference voltage deviation and the measured single voltage deviation of a cell with the average voltage deviation of a group of reference cells over time; and
      transmit the data to relay means; and
   a relay unit configured for implementing stopping the manufacturing process when the measured single voltage is outside the safe single voltage operation range or the difference between the measured single voltage deviation and the reference voltage deviation is outside a predetermined range or a single voltage behavior is different than the average of a group of reference cells, with the data issued from the treatment device and for transmitting an order for stopping the manufacturing process.

8. The system according to claim 7, wherein the treatment device is connected to a server for receiving and analyzing the data issued from the treatment device.

9. The system according to claim 8, wherein the treatment device is connected to an intermediate device configured to relay and/or format the determined data to the server.

10. The system according to claim 9, wherein the acquisition and transmission units are connected to the treatment device by at least one optical fiber.

11. A computer readable medium comprising one or more stored sequences of instruction that is accessible to a processor for ensuring and monitoring electrolyzer safety and performances in a manufacturing process which uses at least one electrolyzing cell containing a cathode and an anode, and which, when executed by the processor, causes the processor to carry out the steps of:

determining a safe single voltage operation range depending on the current and corresponding to a normally working electrolyzing cell;

determining a reference single voltage deviation depending on the time derivation of the current;

measuring the single voltage over time at the terminals of the electrolyzing cell;

determining the measured single voltage deviation by calculating the time derivative of the measured single voltage;

comparing the measured single voltage of a cell with the safe single voltage operation range and the measured single voltage deviation of a cell with the reference voltage deviation and the measured single voltage deviation of a cell with the average voltage deviation of a group of reference cells over time; and stopping the manufacturing process when the measured single voltage is outside the safe single voltage operation range or the difference between the measured single voltage deviation and the reference voltage deviation is outside a predetermined range or a single voltage behavior is different than the average of a group of reference cells.

* * * * *